United States Patent [19]

Hjortsberg et al.

[11] Patent Number: 4,688,142
[45] Date of Patent: Aug. 18, 1987

[54] CURRENT TRANSMISSION SYSTEM FOR HVDC INCLUDING A SOLID INSULATOR HAVING A SURFACE COATING OF RESIN CONTAINING CHROMIUM OXIDE OR IRON OXIDE

[75] Inventors: Arne Hjortsberg; Göran Holmström, both of Västerås; Erik Österlund, Enskede, all of Sweden

[73] Assignee: ASEA Aktiebolag, Västeraås, Sweden

[21] Appl. No.: 918,495

[22] Filed: Oct. 14, 1986

[30] Foreign Application Priority Data

Oct. 16, 1985 [SE] Sweden ............................... 8504809

[51] Int. Cl.$^4$ ..................... H02M 7/00; H02B 1/20; H02G 5/06; H01B 17/42
[52] U.S. Cl. .................................. 361/332; 174/28; 174/99 B; 174/140 C; 363/51; 363/144
[58] Field of Search ............ 174/8, 16 B, 21 C, 22 C, 174/28, 99 B, 137 R, 137 A, 140 C, 141 C, 209; 361/332, 333; 363/51, 144

[56] References Cited

U.S. PATENT DOCUMENTS

| | | | |
|---|---|---|---|
| 2,154,387 | 4/1939 | Sleeman | 174/140 C |
| 2,797,175 | 6/1957 | Horton | 174/140 C X |
| 4,142,230 | 2/1979 | Menju et al. | 361/332 X |
| 4,166,193 | 8/1979 | Schmidt et al. | 174/28 |
| 4,447,671 | 5/1984 | Czech et al. | 174/28 |

*Primary Examiner*—Laramie E. Askin
*Attorney, Agent, or Firm*—Watson Cole Grindle & Watson

[57] ABSTRACT

A system for HVDC transmission comprises a conductor, stressed by d.c. voltage, which is insulated from a surrounded grounded casing by pressurized $SF_6$ gas and along part of its length by at least one solid insulator supporting the conductor in the casing and in contact with the gas. By designing the solid insulator as a core of solid insulating material and a coating, provided thereon, with a high surface resistance, it is possible considerably to reduce the dimensions of the casing. The coating consists of a resinous binder containing a powdered filler in the form of chromium oxide or iron oxide, or a mixture of these substances. The coating preferably has a surface resistance between $10^{12}$ and $10^{18}$ ohm/□ at an electric field strength of 1 kV/mm.

14 Claims, 4 Drawing Figures

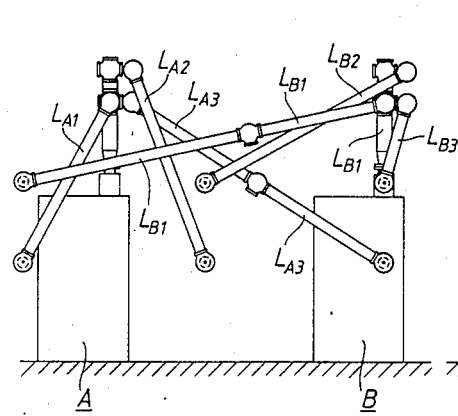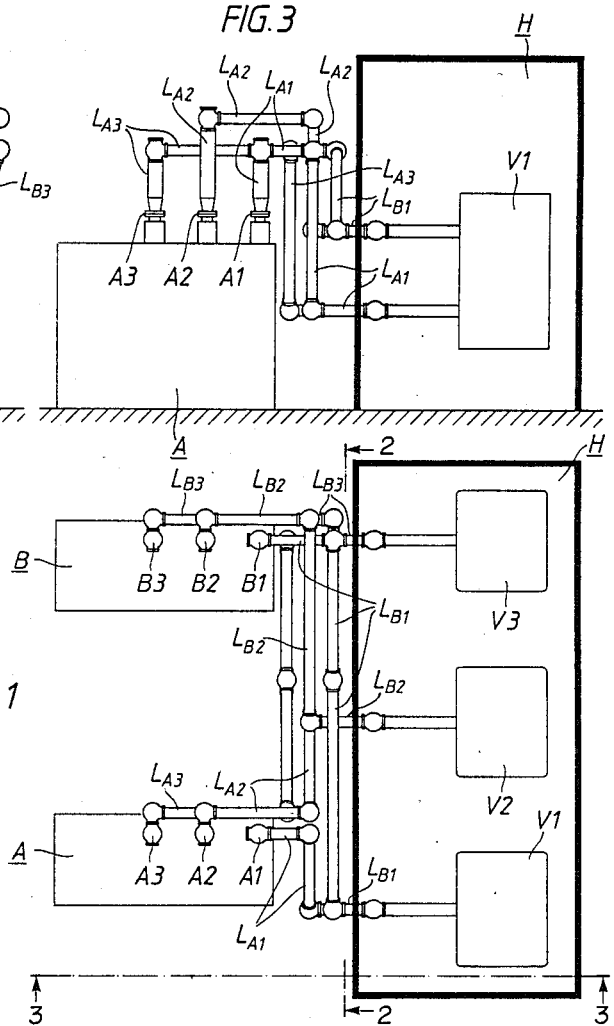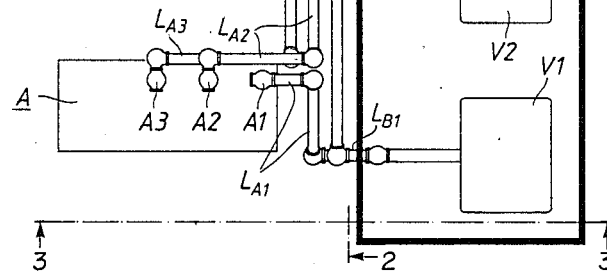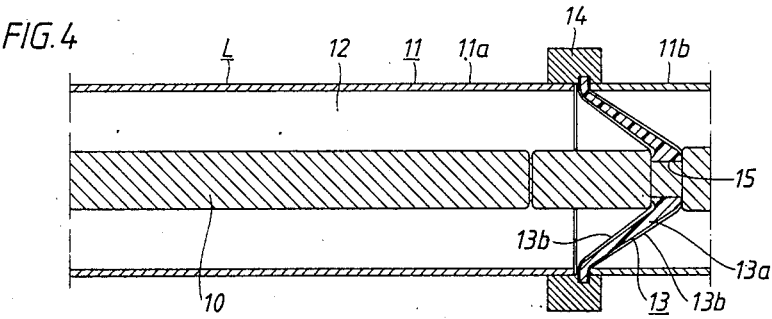

CURRENT TRANSMISSION SYSTEM FOR HVDC INCLUDING A SOLID INSULATOR HAVING A SURFACE COATING OF RESIN CONTAINING CHROMIUM OXIDE OR IRON OXIDE

TECHNICAL FIELD

The present invention relates to a current transmission system for transmission of high voltage direct current (HVDC), comprising a conductor which is under d.c. voltage stress, said conductor being electrically insulated from a surrounding grounded casing by a gas in the form of pressurized sulfur hexafluoride ($SF_6$) and along part of its length by at least one solid insulator extending between the conductor and the casing and arranged in contact with the gas. The invention has particular, but not exclusive, utility in a dc connection line provided between a transformer and converter valve units in a converter station in a HVDC transmission plant.

By surrounding the conductor with a grounded casing, in the manner described above, a bushing of, for example, a transformer to which the conductor is connected, can be protected from fouling by air-borne deposits and moisture and thus protected from surface flashover phenomena caused thereby. The use of pressurized $SF_6$ with its high dielectric strength would allow the use of a casing with relatively small dimensions. However, it has not, up to now, proved to be possible to fully utilize the high dielectric strength of the gas, because the one or more solid insulators, which support the conductor in the casing, have a lower dielectric strength than the gas so that it is this or these insulators which determine the dimensions of the casing.

SUMMARY OF THE INVENTION

The present invention seeks to reduce the dimensions of such solid insulators and hence of the casing supported by the insulators and surrounding the conductor. According to the invention, this result is achieved by forming the solid insulator as a core of solid electrical insulating material with a coating provided thereon, which coating consists of a resinous binder containing a powdered filler consisting essentially of particles of at least one of chromium oxide and iron oxide. Chromium oxide and iron oxide have an inherently high resistivity, that is, each has a low intrinsic conductivity, such conductivity being based on electron conduction. Further, these oxides are very stable and therefore there is no risk of their conductivity being influenced by external factors whereby the conductivity of the coating for this reason becomes excessive, resulting in the insulating function of the insulator being jeopardized. Nor will the insulating function of the insulator be jeopardized if the resinous binder undergoes changes and the barriers of binder between the grains of filler break down, becuase the low intrinsic conductivity of the filler grains will be effective to prevent any significant rise in conductivity of the coating.

A large number of commercially available resinous binders may thus be used in the coating. As examples of resinous binders that can be used may be mentioned epoxy resins, oil-modified alkyd resins, polyurethane resins, polyimide resins, unsaturated polester resins, silicon resins and acrylic resins.

The content of filler in the coating suitably lies between 5 and 80% and preferably between 10 and 55% of the volume of the coating. The particles of the filler, and in any case at least 90% thereof, suitably have a size of 0(0.01) to 200 microns and preferably a size of 0(0.01) to 100 microns. Particularly preferred is particles having sizes in the range of 0(0.01) to 20 microns. The figure 0.01 within brackets after each lower limit indicates that the smallest particles do have a size. The mean particle size in the coating is suitably between 0.2 and 15 microns and preferably between 0.3 and 10 microns. Particularly preferred is a mean particle size of 0.3 to 3 microns. The thickness of the coating suitably lies in the range 2 to 2000 microns and preferably in the range 20 to 300 microns.

In addition to the oxide filler particles mentioned, the resinous binder and the coating, respectively, may to a limited extent, contain other solid particles with a conductivity which is negligible in relation to the resistivity of the filler, such as particles of aluminum oxide, quartz, dolomite, chalk or mica.

The coating preferably has a surface resistance of $10^{12}$ to $10^{18}$ ohm/□ and a particularly preferred surface resistance of $10^{13}$ to $10^{17}$ ohm/□ at an electric field strength of 1 kV/mm on the surface of the solid insulator. By ohm/□ is meant the resistance measured between two opposite sides in a square. The field strength varies across the surface of the insulator depending on the geometrical shape of the insulator and over the main part of the surface it typically will lie within the range 0.5 kV/mm to 10 kV/mm during operating conditions.

A probable explanation of the effect achieved by the invention may be the following: when the solid insulators are subjected to dc voltage stress, an uncontrolled charge accumulation arises on the insulator surface, which gives rise to a considerable distortion of the field configuration in the gas near the insulator surface. This may lead to such high local field strengths that the dielectric strength of the gas is exceeded and a surface flashover is initiated. By applying a coating according to the invention, a controlled current distribution can be achieved on the insulator surface, which in turn provides a field distribution with reduced local peaks of field strength. To achieve this effect, it is an advantage if the coating has a non-linear current-voltage characteristic.

The core of the solid insulator may be made of porcelain or any other ceramic material, or of a plastic material, preferably in the form of a cured cast resin, such as an epoxy resin, an unsaturated polyester resin, an acrylic resin or a polyurethane resin, to which a filler powder such as aluminum oxide, quartz, dolomite, chalk or mica has been added. The content of filler powder suitably lies between 5 and 65% and preferably between 25 and 55% of the total volume of the resin and the filler powder. The filler powder suitably has a particle size in the range 0(0.01) to 100 microns with a mean particle size of between 2 and 15 microns.

BRIEF DESCRIPTION OF THE DRAWING

The invention will now be explained in greater detail, by way of example, with reference to the accompanying drawing, wherein FIG. 1 schematically shows a system according to the present invention seen from above and comprising conductors in connecting lines between transformers and converter valve units in a converter station in an HVDC transmission plant, FIG. 2 schematically shows the same system seen from the plane 2—2 in FIG. 1, FIG. 3 schematically shows the same system seen from the plane 3—3 in FIG. 1, and FIG. 4 shows a connecting line in the system according to FIGS. 1-3 in a longitudinal section.

DESCRIPTION OF THE PREFERRED EMBODIMENTS

FIGS. 1-3 show schematically converter valve units V1, V2, V3 and converter transformers A, B in a converter station in an HVDC transmission plant. The two transformers are located outside a valve hall H. The transformer A is Y/Y connected and the transformer B is Y/Δ connected. The mains winding terminals (not shown) of the transformers are connected to a three-phase alternating voltage network. The converter winding of the transformer A has terminals A1, A2, A3 and the converter winding of the transformer B has terminals B1, B2, B3.

Each one of the three valve units V1-V3, which are arranged inside the valve hall H, is of so-called quadruple type and comprises four electrically series-connected valves, each one consisting of a plurality of series-connected thyristors or diodes. The two bottom valves in the three valve units together form a first three-phase converter bridge with the pulse number six, the a.c. terminals of which are connected to the terminals A1, A2, A3 of the transformer A by means of connecting lines $L_{A1}$, $L_{A2}$, $L_{A3}$. The two top valves in the three valve units together form a second three-phase converter bridge with the pulse number six, the a.c. terminals of which are connected to the terminals B1, B2, B3 of the transformer B by means of the connecting lines $L_{B1}$, $L_{B2}$ and $L_{B3}$.

The construction of and the mode of operation of a converter station of the kind described above are well-known, for example from Erich Uhlmann: *Power Transmission by Direct Current,* Springer-Verlag, Berlin, Heidelberg, New York, 1975, and FIGS. 2.7, 6.7, 21.2 with their associated descriptions.

The connecting lines $L_{A1}$, $L_{A2}$, $L_{A3}$, $L_{B1}$, $L_{B2}$ and $L_{B3}$ are subjected to high d.c. voltage stress and are designed as gas-insulated lines containing $SF_6$ with a pressure of 3.5-5.5 atmospheres.

The conductors in the connecting lines are supported by solid insulators, as will be described in greater detail with reference to FIG. 4.

In FIG. 4 a connecting line is generally designated L. It comprises a conductor 10 and a grounded casing 11 in the form of a tube which surrounds the conductor 10. In the part of the connecting line illustrated, two casing parts 11a and 11b make contact with each other at end surfaces. Along the main part of its length the conductor 10 is insulated from the casing 11 by pressurized $SF_6$ gas filling the space 12 and along part of its length the conductor 10 is insulated from the casing 11 by means of a solid insulator 13, or several such insulators, supportingly arranged between the conductor 10 and the casing 11. The insulator 13 is sealingly fixed to the casing 11 by a ring 14 and supports the conductor 10 via a central hole 15. The insulator 13 consists of a central body or core 13a of electrically insulating material and of coatings 13b, applied on its exposed surfaces, of a type exemplified below which may have a surface resistance of $10^{15}$ ohm/□ at a voltage of the conductor 10 of 300 kV, which in the exemplified case gives an electric mean field strength of 1 kV/mm over the main part of the surface of the insulator 13.

The core 13a of the solid insulator 13 may, according to one embodiment, be manufactured from a resin consisting of 100 parts of an epoxy resin of bisphenol A-type and containing between 5.15 and 5.5 mole epoxy groups per kg (e.g. a resin known by the code CY 205 and obtainable from Ciba Geigy, of Switzerland), 80 parts of methyl tetrahydrophthalic acid anhydride and 1 part of benzyl dimethylamine, to which aluminum oxide powder with a grain size of 0(0.01) to 100 microns and a mean grain size of 15 microns have been added so that the content of aluminum oxide constitutes 35 per cent by volume in the product so composed. In the preceding sentence and in the remainder of the description, the word "parts" refers to parts by weight. The curing of the resin may be carried out by gelation at a temperature of 150° C. for 45 minutes and an after-curing at a temperature of 130° C. for 10 minutes.

In place of the epoxy resin there may be used, among other things, an acrylic resin manufactured from 100 parts of decyl methacrylate, 5 parts of 1,4-butane-diol-dimethacrylate and 1 part of benzoyl peroxide, which can be cured at 50° C. for 3 hours, or an unsaturated polyester resin consisting of a reaction product of 1 mole isophthalic acid, 0.5 mole adipic acid, 0.5 mole maleic acid and 2.2 moles propylene glycol, to which 30 percent by weight styrene and 1 percent by weight benzoyl peroxide have been added. The resin can be cured at 130° C. for 3 hours.

The coating 13b on the core 13a can be effected by means of an air drying alkyd (e.g. SOALKYD 3046 from AB SOAB, Sweden) dissolved in xylene and containing 30 percent by volume chromium oxide, calculated on the alkyd without solvent, with a size of the chromium oxide grains of between >0.2 micron and 13 microns and with a mean grain size of 1.2 microns. The coating is applied to a thickness of 80 microns.

In place of using an air drying alkyd, there may be used, among other things, a binder consisting of 100 parts of an epoxy resin of bisphenol A-type and containing between 5.15 and 5.5 moles epoxy groups per kg (e.g. Epikote 828 from Shell, Holland) and 50 parts hardener of aminoamide type with an amine value of 400-460 mg KOH/g, dissolved in equal parts xylene and butanol, or a binder in the form of a polyurethane resin, built up of 100 parts hydroxyl compound (e.g. Desmofen 160 from Bayer AG, Fed. Rep. of Germany), 21 parts isocyanate (e.g. Desmodur N 75 from Bayer AG) dissolved in ethylglycol acetate.

In place of chromium oxide there may be used, in the above-exemplified case, 30 percent by volume of iron oxide with the same size of the grains, or a mixture of 15 percent by volume chromium oxide and 15 percent by volume iron oxide, both having the above stated size of the grains.

We claim:

1. An HVDC current transmission system, comprising a conductor, stressed by d.c. voltage, which is electrically insulated from a surrounding grounded casing by a gas in the form of pressurized sulfur hexafluoride ($SF_6$) and along part of its length by at least one solid insulator in contact with the gas and extending between the conductor and the casing, and wherein the solid insulator comprises a core of solid electrical insulating material with a coating provided thereon, the coating consisting of a resinous binder containing a powdered filler consisting esentially of particles of at least one of chromium oxide and iron oxide.

2. A system according to claim 1, in which the content of the filler in the coating amounts to between 5 and 80 percent of the volume of the coating.

3. A system according to claim 1, in which the content of the filler in the coating amounts to between 10 and 55 percent of the volume of the coating.

4. A system according to claim 1, in which the size of the particles in the filler lies in the range 0.01 to 100 microns.

5. A system according to claim 1, in which the coating has a thickness in the range of 20 to 300 microns.

6. A system according to claim 1, in which the coating has a surface resistance in the range of $10^{12}$ to $10^{18}$ ohm/□ when a field strength of 1 kV/mm exists on the surface of the solid insulator.

7. A system according to claim 1, in which the coating has a surface resistance in the range of $10^{13}$ to $10^{17}$ ohm/□ when a field strength of 1 kV/mm exists on the surface of the solid insulator.

8. A system according to claim 1, in which the electric field strength existing over a major proportion of the surface of the solid insulator when under operating voltage stress lies in the range 0.5 to 10 kV/mm.

9. A system according to claim 1, in which the coating has a voltage-dependent resistivity.

10. A system according to claim 1, in which the particles constituting the filler at least substantially consist of chromium oxide.

11. A system according to claim 1, in which the particles constituting the filler at least substantially consist of iron oxide.

12. A system according to claim 1, in which the core consists of a plastic material.

13. A system according to claim 12, in which a powdered filler is incorporated in the plastic material forming the core.

14. In an HVDC transmission plant having a transformer and a converter valve unit, the provision of an electrically conducting link between the transformer and the converter valve unit, the link comprising a conductor located within a grounded casing containing pressurized electrically insulating gas and with at least one solid insulator spacing the casing from the conductor, and wherein the solid insulator is coated with particles of at least one of chromium oxide and iron oxide in a set resin binder.

* * * * *